Jan. 3, 1967 R. E. LEE 3,295,302
GRAIN PICKUP WITH RUBBER TEETH
Filed May 24, 1965
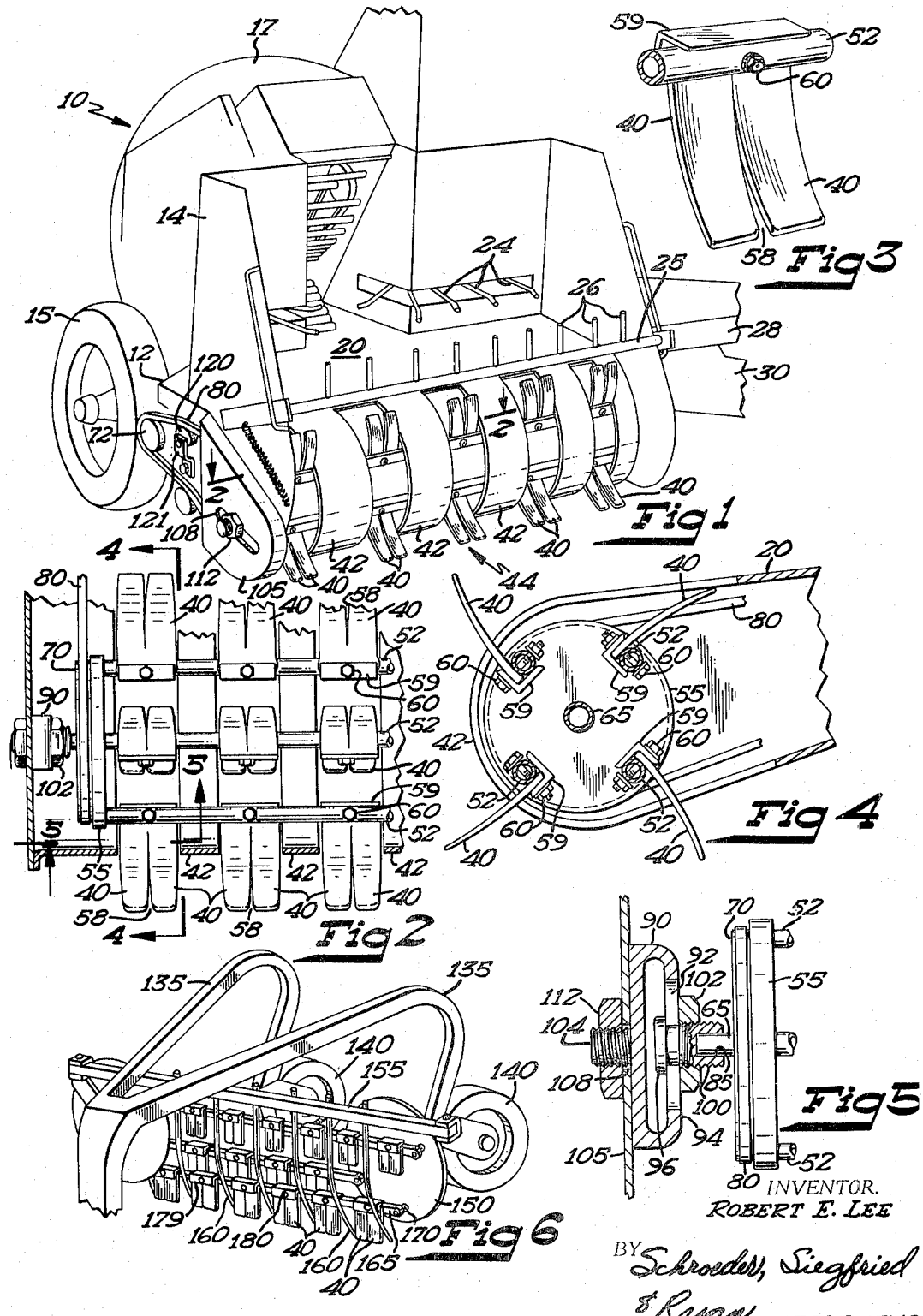
INVENTOR.
ROBERT E. LEE
BY Schroeder, Siegfried & Ryan
ATTORNEYS

United States Patent Office 3,295,302
Patented Jan. 3, 1967

3,295,302
GRAIN PICKUP WITH RUBBER TEETH
Robert E. Lee, Larimore, N. Dak. 58251
Filed May 24, 1965, Ser. No. 458,091
9 Claims. (Cl. 56—364)

This invention relates to agricultural apparatus and more particularly to an improved grain pickup attachment device used for picking up varied types of severed vegetation such as hay, grain and the like. The improved grain pickup attachment uses broad rubber pickup tooth members which are flexible along their extent and provide an efficient sweeping action for picking up short grain. The term "grain" as used herein indicates varying types of vegetation which is severed and being capable of being picked up by apparatus of this class. The present application is an improvement over my co-pending application Serial No. 375,533 dated June 16, 1964, entitled Grain Pickup Attachment.

In prior grain pickup apparatus or attachment used with harvesters, thrashers, hay balers, and the like, the grain pickup fingers or tooth members have generally been rigid or semi-rigid metallic members or spikelike rubber members which have proved ineffective in the picking up of short severed vegetation or grains. In my prior application on the Grain Pickup Attachment, I have disclosed belts of rubber fingers which cooperate together through side camming action to effect the closure on the severed vegetation to pick the vegetation up and transmit it to associated apparatus. Such a construction is extremely effective in the picking up of short grain but is somewhat complex in structure and requires operation of a camming device operating on the fingers to deflect the same in the pickup operation. Thus the overall apparatus is not readily interchangeable with existing equipment and requires more time in the maintenance and in the interchange of pickup tooth members or belts.

The present invention relates to an improved grain pickup attachment having wide flexible tooth members spaced thereon and cooperating with stationary guide plates to provide an effective pickup mechanism for short severed vegetation. The tooth members are designed to substantially fill the spacing between cooperating and stationary guide plates in the pickup attachment such as to provide a wiping action therewith to increase the efficiency of pickup such that the severed grain may be directed to the associated agricultural apparatus for any desired purpose. The improved tooth members provide a sweeping or brushing action and the individual teeth are flexible such that they are not damaged by engagement with rocks or any obstructions and provide a substantially longer maintenance free life than comparable equipment. Further, the improved tooth members are made of a rubber material which is readily available for usage and may be very simply fabricated without special tooling such that it may be installed on existing equipment with a minimum of time, effort and expense.

It is therefore an object of this invention to provide an improved grain pickup apparatus with wide rubber teeth.

Another object of this invention is to provide in an improved grain pickup apparatus broad flexible tooth members particularly adapted for the use in picking up short severed vegetation or grain.

Another object of this invention is to provide in an improved grain pickup apparatus an arrangement, shape and locationing of fixed and rotating parts to provide for increased efficiency in pickup.

A further object of this invention is to provide in an improved grain pickup apparatus a tooth construction and arrangement which substantially reduces tooth wear, breakage, and may be readily fabricated and installed.

A still further object of this invention is to provide an improved grain pickup attachment readily applicable to hay balers, grain pickups and side delivery rakes.

It is also an object of this invention to provide an improved grain pickup attachment in which the relative positioning of the teeth with stationary portions of the grain pickup including guides for directing the severed grain into associated apparatus may be readily adjusted for increased efficiency in operation.

A still further object of this invention is to provide an apparatus of this type which has extremely long life, ease in replacement and is economical to manufacture and maintain.

These and other objects of this invention will become apparent from a reading of the attached description together with the drawings wherein:

FIGURE 1 is a perspective view of an embodiment of the improved grain pickup attachment with wide rubber teeth included on a hay baler.

FIGURE 2 is a sectional view of the mounting for the pickup teeth in a baler taken along the lines 2—2 in FIGURE 1.

FIGURE 3 is a perspective view of an individual pickup tooth member.

FIGURE 4 is a sectional view of the pickup attachment on the hay baler of FIGURE 2 taken along the lines 4—4 therein.

FIGURE 5 is a sectional view of a portion of the pickup attachment and the drive and adjusting means therefor on the hay baler of FIGURE 2 taken along the lines 5—5 therein.

FIGURE 6 is a perspective view of the improved grain pickup tooth members applied to a side delivery rake.

The improved grain pickup attachment utilizing the wide flexible tooth members is shown in FIGURE 1 as attached to an agricultural processing type machine, such as a hay baler, indicated schematically at 10. The same attachment may be similarly applied to harvester type apparatus in its varying forms. Inasmuch as the details of the associated apparatus, such as the processing machine, form no part of the present invention, it is disclosed herein only schematically and may take varying forms. Thus the processing machine is indicated generally as including a suitable mounting frame 11 having a wheeled support structure 15 with an upstanding walled construction 14 and a processing apparatus indicated generally at 17. The walled construction defines with the base mounting structure 12 a table or platform area 20 onto which vegetation, such as grain, is to be moved after being picked up by the pickup attachment normally positioned in front of the same with respect to the direction of travel of the machine. As shown in FIGURE 1, the baler includes a throat portion 21 having suitable feeder fingers 24 adjacent the same which operates to move the grain or vegetation from the table portion into the throat of the processing machine, this apparatus being suitably driven by a self-contained or attached power transmission machinery. Also included in the processing machine is an adjustable mounting arm 25 having a plurality of retaining fingers 26 thereon which are adjustably positioned through a connecting link 28 to retain the grain picked up and positioned on the surface of the table such that it may be advanced to the throat of the processing machine by the fingers 24. The entire apparatus is suitably connected or attached to motive equipment through supporting and attaching arms indicated at 30.

The grain pickup attachment portion of the apparatus utilizes wide relatively flexible rubber tooth members 40 which project between guide plates 42 of the guide structure indicated in general at 44, the guide structure being secured at one extremity to the base 12 of the machine.

The sectional view in FIGURE 2 shows the supporting structure mounting the tooth members to be formed of a plurality of elongated channels or rods 52 mounted in supporting collars or discs 55 at the extremities thereof. Each support member has a plurality of tooth members 40 connected thereto and spaced along the extent of the same. The individual tooth members will best be seen in perspective in FIGURE 3 as being a relatively rectangular configuration having a width to length ratio of somewhere between 1-2 and 1-4. The individual tooth members are relatively platelike in form and as will be hereinafter noted, may be formed from the center face of tire carcasses, that is, cut from the same. In addition, the tooth members may be solid fingers or may have a split 58 extending lengthwise along the same intermediate the side edges and extending from one surface substantially through to the other surface. Thus they will have the same width dimension at the tip or grain engaging extremity of the tooth member as that throughout the body of the tooth member and at the points of fastening or mounting of the same. This will give a brushing action with the ground and severed grain thereon and will greatly enhance the pickup ability of the tooth members. The tooth members have apertures (not shown) drilled therein along one edge of the width extent and angle iron retaining flanges 59 which can be a single strip or a plurality of pieces which serve as a means for connecting the tooth members to the rodlike elongated members or supporting bars 52. Thus as will be seen in FIGURES 2 and 3, the plurality of tooth members are secured to the elongated members 52 through the flanges 59 which are connected to bars 52 through suitable nut and bolt means indicated at 60. It will also be noticed that the tooth members 40 are mounted on the elongated support rods or members in a spaced relationship such as is indicated in FIGURE 2. Depending upon the width of the cooperating guide plates 42 which form the entrance portion of the table for the processing machine to support the vegetation or grain as it is raised from ground level to processing machine level, this width will vary such that the tooth members will be in near contacting relationship or may even bear against the sides of the cooperating guide members to provide a wiping action insuring positive delivery of the vegetation to the entrance table or platform of the processing machine. Although only a single thickness of the tooth member is shown in the drawings, it will be understood that several thicknesses in stacked relationship may be used as a single tooth member to improve brushing action.

As will be seen in FIGURE 4, the slot portions in the entrance table defined by the guide plates projecting therefrom do not extend all the way back to the table surface 20 of the processing machine but rather terminate in close proximity to the area where the tooth members are moved down below the surface of the guide structure. Thus as will be seen in FIGURES 1 and 4, the guide structure 44 also has a solid surface in which the vegetation is positioned forward of the table surface 20 of the processing machine so that the movement of the vegetation thereon will be urged by additional materials or grains picked up by the fingers. The individual support members 52 are mounted in the supporting collars or drums 55 which in turn are connected to shafts 65 at the extremities of the drums. One of the shafts 65 has associated therewith a pulley 70 in positive driving relationship with the shaft, as seen in FIGURE 4, to cause rotation of the support structure in a conventional manner. The tooth members mounted on each of the elongated bars are directed radially out from the axis of rotation of the shafts 65 and 4 or 5 such elongated members may be employed. As will be seen in FIGURE 5, the stub shafts 65 include a special adjustable mounting, only one of which is shown, which permits adjustment of the supporting structure of the tooth members, that is the elongated members 52 and the discs 55 relative to the remaining support structure and the base as well as the guide plate structure 44 to vary the amount of tooth exposed during the rotation of the tooth members. This will vary the extension of the tooth members beyond the surface of the guide plates to increase the amount of grain picked up. It will be noted that the support structure with the elongated members 52 thereon are rotated about the axes of the shafts 65 through rotation of the pulley 70 which is in a driving connection with a drive pulley 72 on the base 12 of the processing machine and coupled thereto through a suitable belt or chain drive 80. The rotation of the pulleys 72 and 70, that is the drive pulley 72 through the chain or belt 80 to the pulley 70 will define a circular path of rotation for the support structure with the tooth members 40 thereon. The guide support structure with the individual guide plates 42 are supported on a base structure 12 of the processing machine through a supporting structure (not shown). The guide plates or members define spaced slots through which the tooth members project and the extent of the guide plates in the vicinity of the support structure for the tooth members is generally circular or curved. Thus, the support structure for the elongated members can be said to describe an orbital movement with the curved extent of the guide plates 42 intersecting this path of orbital movement such that a greater amount of the tooth member extends beyond the surface of the guide plates at the lower edge of the processing machine and forward edge of the processing machine than at the upper or exposed surface of the guide plates adjacent the solid section forming the table portion 20 with the processing machine. Thus the support shafts 65 are made adjustable with respect to the curved portions or plates 42 of the guide structure such that the amount of the tooth members extending beyond the surface of the same in the grain pickup operation may be adjustable.

In the past a rather complex drive and camming structure had been employed for the members mounting the pickup fingers to adjust the path of movement of the fingers relative to the guide plate structures. In the present invention, a simplified mounting structure for the supporting structure of the tooth members is provided which simplifies the adjustment of the same and the mechanical structure involved to reduce maintenance and wear problems. Thus as will be seen in FIGURE 5, a shaft 65 is mounted in a trunnion or journal 85 which in turn is slidably positioned in a yoke member 90 having a guide portion 92 through which a shaft part 94 of the journal 85 is positioned with a headed portion 96 extending to the opposite side of the guide member 92 to permit relative movement and guided movement of the journal 85 along the extent of the guide portion in the yoke member 90. The outer periphery of the journal is threaded as at 100 and a cooperating nut 102 is mounted thereon which permits securing of the journal member 85 in the guide portion 92 of the yoke member 90 in varying positions along the extent of the guide portion therein. The yoke member 90 in turn has a transversely extending shaft portion 104 which extends through the outer support member 105 of the pickup attachment and through a slot 108 therein with the shaft being threaded and having an exposed clamping nut 112 positioned thereon such that it may be adjusted and clamp the yoke member within the support member 105. The slot 108 and the slot in the guide member 92 are normal to one another so as to permit adjustment of the shafts relative to the support member 105 from the pickup attachment attached to the processing machine or the base structure 12 thereof such that the shafts may be adjusted in varying positions relative to the guide structure and the guide plates 42 attached thereto. In this manner, the tooth members 40 on the elongated support rods or members 52 may be made to extend in varying degrees beyond the surface of the guide plates to effect the extent and efficiency of pickup. Normally the axial alignment of the shafts 65 with the side support members 105 and the guide plates 42 of the guide structure 44 attached thereto is such as to place the center of rotation of the tooth supporting structure below the center of curvature of the guide plates and slightly forward of the center of curvature thereof so that, as will be seen in FIGURE 4, a larger portion of the tooth members will project beyond the surface of the guide plates in the lower and forward positions.

As will be evident in FIGURE 1, the drive pulley 72 connected to the drive means rotates counter-clockwise, as viewed in FIGURE 1, so as to drive the support structure in a similar direction of motion. This will cause the tooth members to raise or rotate forward of the extent of the processing machine or ahead of the same picking up grain out in front of the processing machine and raising it along the edge of the guide structure or guide plates 42 to the solid portion of the guide structure and the table 20 of the processing machine. The tooth members as they are rotated provide a sweeping or brushing action very effective in picking up short severed vegetation which with the guide plates provide a generally continuous surface since the tooth members fill the spacing therebetween to effect an increased efficiency in pickup of short vegetation. Similarly, the flexible tooth members do not strip from the ground weeds, vines and other unsevered vegetation in the pickup operation, and thereby further add to the efficiency of their operation. The flexible tooth members may be deflected by rock obstructions without damage thereto. In order to provide for an adjustment of the belt or chain 65, an adjustable pulley 120 is mounted on an adjustable linkage 121 and rides against the belt member to effect tightening of the same and to permit ease in removal for maintenance purposes.

The improved tooth structure and mounting of the same is shown in FIGURE 6 as applied to a side delivery rake. Although a conventional rake is shown, it will be understood that this principle applies to disc type rakes, roto-beaters, and also to other types of side delivery rakes. Only that portion of the rake which includes the mounting of the tooth members is shown in detail inasmuch as the remaining structure of the rake is conventional. Thus it will be recognized in FIGURE 6 that the cantilever supporting arms 135 connect to a wheel structure 140 upon which is supported in a conventional manner the drive discs for the rake, indicated at 150. In addition, a tine or rod supporting structure 155 with a plurality of depending rodlike members 160 thereon extend forward of the rake to cooperate with the pickup teeth in the movement of the vegetation to be moved to the side of the rake as it is operated. The drive connections to the drive discs 150 are omitted for simplicity, it being understood that any conventional structure may be employed. Positioned between the drive discs which are pivotally mounted in their driving connection on the supporting structure to vary the degree or angle of delivery are the supporting rods 165 which carry the tooth members of the rake. These rods are suitably journaled and pivoted on the drive discs, as at 170, to position the tooth members 40 on either side of the rods in a depending direction as the discs are rotated and thereby provide a pickup and forward brushing action to move the vegetation forward and to the side as the discs are rotated. In the present embodiment of the invention, the conventional rodlike tooth is replaced with the wide flexible tooth member 40 in a spaced relationship, the spacing being slightly larger than the depending rods 160 such that the rods may be positioned therebetween in certain portions of the orbital path of travel of the rake teeth so as to cooperate therewith and provide a more efficient movement of the vegetation and pickup of the same. The individual supporting rod 165 mounts the tooth members 40 in the same manner as the before mentioned embodiment, in that the rods will have holes drilled therein and suitable flange 179 and bolt means 180 secure the teeth at one edge thereof such that the rectangular teeth project therefrom in a substantially vertically direction for the normal positioning of the rods on the disc drive members. The number of securing bolts and the size of the flange vary for various sized tooth members and the physical size of the tooth members 40 will be in the ratio of 1–2 and 1–4 with respect to width and length. The improved tooth members provide an increased efficiency in the operation of the side delivery rake in that they provide a broad brushing action of the vegetation and a movement of the vegetation to the side. The same tooth members may also be applied to disc type side delivery rakes by mounting the tooth member radially on the disc members (not shown).

In the operation of the grain pickup attachment or modification for the processing machine such as balers, harvesters and the like and the application of the same to the side delivery rake, the broad flexible tooth members which are normally made of a semi-rigid rubber material capable of flexing are applied to the supporting structure in a spaced relationship such that they may cooperate with the guide rods or support or guide plates in the rake and processing machines respectively to provide for increased efficiency in the pickup and a more effective coverage of the ground than has previously been obtained with conventional rodlike pickup fingers. Thus in the harvester or processing type machine, the supporting elongated members 52 for the tooth members 40 are mounted in discs and rotated about a common axis which axis is adjustable with respect to the rest of the processing machine to vary the relationship of the teeth in their orbital path or circular path of movement with respect to the cooperating guide structures. The tooth members project through and substantially fill the opening or spacing between the guide plates and the extent of the tooth member projecting thereon will depend upon the adjustment of the cooperating supporting structures for the shafts 65 of the support structure for the elongated members. In this relationship, the curved path of the guide plates intersects the path of movement of the tooth members and this relationship may be adjusted to change the positioning of the tooth members relative to the guide plates. The apparatus is normally adjusted so that only a small portion of the tooth member projects above the surface of the guide plates on the top side of the grain pickup attachment so as to eliminate pinching the grain and permit efficient movement of the grain cut across the table to the entrance of the processing machine. This adjustment of the support structure for the elongated members mounting the tooth members is effected by adjusting the position of the trunnion or journals 85 mounting the shafts 65, only one of which is shown, on either side of the support structure with respect to the side supporting structure of the grain pickup attachment. By loosening the nuts 102, the shafts 94 which are slidably mounted in the guide portion 92 of the yoke member 90, may be adjusted in a direction, preferably vertically, to vary the position of the support structure in this direction. Similarly the nut 112 may be loosened and the shaft 104 moved in the slot 108 in a substantially horizontal direction to effect movement of the support structure for the tooth members in a horizontal direction toward and away from the forward end of the grain pickup attachment. This positioning is normally held forward of the center of curvature of the guide plates for more efficient positioning in movement of the grain on the table portion of the guide structure and to the table portion 20 of the processing machine. The cooperative positioning of the tooth members with the guide plates insures a maximum efficiency in the pickup of short grain.

In the side delivery rake, the same cooperation is provided with the same relative spacing and mounting of the tooth members on the support bars for the pickup fingers of the rake. Thus in the operation of the side delivery rake, the tooth members are moved in an orbital path and project beyond the guide rods and between the same substantially filling the spacing to provide for efficient pickup of the vegetation and delivery of the same to the side of the rake in a conventional manner. The tooth members are shown and described herein as rectangular and flexible plate-like members which are preferably made of a semi-rigid rubber material. I have found that the face of tire carcasses permit a ready source of material which is cheap and readily available for most farm operators using this type of equipment. In this manner, the tooth members may be simply cut from the face of tires and fabricated without any special tooling to be mounted on the pickup attachment of the various types of processing machines and rakes previously described. The physical size of the tooth members may be determined and the parts shaped to fit in cooperating relationship in a simple manner. Further, the actual structure of the tooth members reduces breakage and provides efficiency in the grain pickup operation.

The present disclosure shows schematically varying types of structure in limited detail to which the grain pickup attachment and the tooth members may be applied. It will be recognized that the individual supporting structures, and the methods of attachment thereto may be varied within the scope of the present invention. Therefore in considering the invention it should be remembered that the present disclosure is intended to be illustrative only and the scope thereof should be determined by the appended claims.

What is claimed is:

1. In a device of the class described, in combination: a support structure including a plurality of elongated members; a plurality of generally rectangular platelike flexible tooth members secured at one edge in spaced relationship along the extent of the elongated members; means connected to the support structure to move the elongated members in an orbital path about an axis generally parallel to the extent of the elongated members such that the tooth members thereon are adapted to pick up grain; stationary guide means positioned adjacent the support structure and including a plurality of guide plates intersecting part of the path of orbital movement of the elongated members and substantially filling the spacing between the spaced flexible tooth members on the elongated members such that the tooth members project beyond the guide plates in a portion of their path of relative movement and provide a wiping action with the guide plates to provide positive grain pickup and unloading of the grain picked up by the tooth members.

2. The apparatus of the class described in claim 1 in which each tooth member is split along its extent lengthwise substantially to the edge attached to the elongated member.

3. The apparatus of the class described in claim 1 in which the generally rectangular form of the tooth members is of such dimension to give a ratio of the width to the length of approximately 1–2.

4. The apparatus of the class described in claim 1 in which each tooth member has a ratio of the width to the length of the rectangular tooth member of greater than 1–2 and less than 1–3 and the tooth member is a flat plate of rubber material.

5. The apparatus of the class described in claim 4 in which the guide plates are approximately the same width as the width of the tooth members.

6. In a device of the class described in combination: a support structure including a plurality of elongated members; a plurality of generally rectangular platelike flexible tooth members secured at one edge in spaced relationship along the extent of the elongated members; means connected to the support structure to move each of the elongated members in an orbital path; a plurality of stationary guide plates positioned adjacent the support structure and between respectively the plurality of flexible tooth members thereon substantially filling the spacing therebetween to cooperate with the flexible tooth members in the pickup of grain.

7. The apparatus of claim 6 in which the flexible tooth members are rectangular rubber plates secured on one edge to the mounting means in spaced and aligned relationship and cooperate with the guide plates during the orbital movement of the mounting means with the tooth members thereon to provide a wiping action therebetween in the aid of the pickup of grain.

8. The device of a class described in claim 1, and including means for shifting the relative positioning of the guide plates relative to the extent of the tooth members to change the length of the tooth members projecting beyond the guide plates in portions of the path of orbital movement of the same.

9. In a device of the class described in combination: base means including a wheel support mounting the same for rolling movement, a support structure mounted on said base means, said support structure including a plurality of elongated members; a plurality of generally rectangular platelike flexible tooth members secured at one edge in spaced relationship along the extent of the elongated members; means connected to the support structure to move the elongated members in an orbital path about an axis generally parallel to the extent of the elongated members such that the tooth members thereon are adapted to pick up grain; stationary guide means mounted on said base and positioned adjacent the support structure including a plurality of guide plates intersecting part of the path of orbital movement of the elongated members and substantially filling the spacing between the spaced flexible tooth members on the elongated members such that the tooth members project beyond the guide plates in a portion of their path of relative movement to provide a broad tooth edge for grain pickup and a wiping action with the guide plates for effective carrying and unloading of grain picked up by the tooth members, a driving connection means including a journal support included in the means connected to said support structure and mounted on said base structure; said last named means including adjustable means for shifting the relative position of the support structure relative to the guide means to vary the extent of the tooth members projecting beyond the guide plates.

References Cited by the Examiner

UNITED STATES PATENTS

| | | | |
|---|---|---|---|
| 2,796,722 | 6/1957 | Hanford et al. | 56—364 |
| 2,833,106 | 5/1958 | Schraeppel | 56—377 |
| 3,027,701 | 4/1962 | Campbell | 56—24 |
| 3,221,483 | 12/1965 | Ronning | 56—27 |

ABRAHAM G. STONE, *Primary Examiner.*

ANTONIO F. GUIDA, *Examiner.*